United States Patent [19]
Okada et al.

[11] Patent Number: 5,433,888
[45] Date of Patent: Jul. 18, 1995

[54] PHOSPHOR COMPOSITION, PHOSPHOR-COATING COMPOSITION, DISCHARGE LAMP AND PREPARATION METHOD THEREOF

[75] Inventors: Kouichi Okada; Toshiaki Tateiwa; Tetsuya Sadamoto; Yoshihito Hario; Yuji Itsuki; Masato Fujiwara; Osamu Sakai; Kenji Fujino, all of Anan, Japan

[73] Assignee: Nichia Kagaku Kogyo, K.K., Tokushima, Japan

[21] Appl. No.: 123,710

[22] Filed: Sep. 20, 1993

Related U.S. Application Data

[62] Division of Ser. No. 767,805, Sep. 30, 1991, abandoned.

[30] Foreign Application Priority Data

| Oct. 2, 1990 | [JP] | Japan | 2-266077 |
| Jan. 26, 1991 | [JP] | Japan | 3-025323 |
| Jan. 26, 1991 | [JP] | Japan | 3-025324 |
| Jan. 26, 1991 | [JP] | Japan | 3-025325 |
| Jan. 26, 1991 | [JP] | Japan | 3-025326 |

[51] Int. Cl.⁶ .............................................. C09K 11/80
[52] U.S. Cl. ........................... 252/301.4 R; 106/287.18
[58] Field of Search ............ 428/403; 427/64, 67; 252/301.4 R; 106/287.18

[56] References Cited

U.S. PATENT DOCUMENTS

| 3,607,371 | 9/1971 | Haynes et al. | 427/64 |
| 4,396,863 | 8/1983 | Ranby et al. | 428/403 |
| 4,459,507 | 7/1984 | Flaherty | 204/192.15 |
| 4,710,674 | 12/1987 | Sigai | 427/67 |
| 4,890,033 | 12/1989 | Ichinomiya et al. | 313/487 |
| 4,952,422 | 8/1990 | Pappalardo et al. | 427/67 |

FOREIGN PATENT DOCUMENTS

| 56-047479 | 4/1981 | Japan . |
| 2082618 | 3/1982 | United Kingdom . |

Primary Examiner—Mark L. Bell
Assistant Examiner—C. M. Bonner
Attorney, Agent, or Firm—Nixon & Vanderhye

[57] ABSTRACT

A phosphor composition contains phosphor particles and a water-soluble rare earth compound uniformly covering the surfaces of the phosphor particles. The rare earth compound is present in an amount of from 0.001 to 5% by weight in terms of the corresponding rare earth oxide, based on the weight of the phosphor particles.

2 Claims, 2 Drawing Sheets

PHOSPHOR COMPOSITION, PHOSPHOR-COATING COMPOSITION, DISCHARGE LAMP AND PREPARATION METHOD THEREOF

This is a division of application Ser. No. 07/767,805, filed Sep. 30, 1991, now abandoned.

BACKGROUND OF THE INVENTION

1. Field of the Invention

The present invention relates, in a broad sense, to a technical field of phosphors other than silicate phosphors. More specifically, it relates to a phosphor composition based on such phosphors, a phosphor-coating composition, and a discharge lamp using the same, as well as a preparation method thereof.

2. Description of the Related Art

Silicate phosphors, no matter when used singly or in combination, comprised mainly of silicate (50% by weight or more), whereas the present invention relates to a phosphor whose major component is other than silicate (i.e., even when the silicate phosphor is present, its content is less than 50% by weight). Hereinafter, such phosphors containing silicate phosphors, if present, in an amount of less than 50% by weight will be referred to simply as phosphors.

Phosphors have been commonly utilized for a discharge lamp, for instance, a fluorescent lamp. They have been used not only singly, but also in mixture. Such a mixture includes as a so-called three-component type phosphor composition containing a red luminous phosphor, a blue luminous phosphor and a green luminous phosphor. Recently, even a five-component type phosphor composition having an improved color rendering property has been commercially available. To reiterate, phosphors of the type used in the invention are clearly distinguished in terms of the major component from silicate phosphors whose major component is silicate.

In general, a discharge lamp, e.g., a fluorescent lamp is prepared in such a manner that phosphors are suspended in a highly viscous solution (vehicle) prepared by dissolving a binder in a solvent, to prepare a phosphor suspension (phosphor-coating liquid). The phosphor-coating liquid is coated on an inner wall of a bulb, and the coated material is baked, obtaining a fluorescent lamp. The phosphor-coating liquid may be roughly classified into two types depending on the kind of the solvent used: one is organic type using an organic solvent and the other is aqueous type using water as a solvent. Although the organic coating liquid has advantages such as easiness in drying, it has been confronting with difficulties in operational management such as affection to human body, safety control for operators, etc. Therefore, at present, the aqueous phosphor-coating liquid has been attracting a great deal of attention to those skilled in the art.

Meanwhile, in order to prevent the phosphor layer from peeling off the inner wall of the bulb, an adhesive material is usually used together. Such an adhesive material may be added to the phosphor-coating liquid, or alternatively may be previously attached to the surfaces of phosphor particles.

As adhesive materials added to the phosphor-coating liquid, calcium barium borate, calcium pyrophosphate, and aluminum oxide, for example, are known. These adhesive materials are used in the form of a slurry of fine particles. As adhesive materials covering the surfaces of phosphor particles, there are known phosphates or borates of alkaline earth metals, aluminum oxide, and a mixture of these compounds, as disclosed in Published Unexamined Japanese Patent Application (Kokai) No. 63-289087. There are also known a frit glass prepared from calcium pyrophosphate and calcium tetraborate, and a water-resistant glass composition having a low melting point, expressed by $Ln_2O_3$-MnO-$B_2O_3$, where Ln is Y or a lanthanoid, M is Mg, Ca, Sr, Ba, and/or Zn). These conventional adhesive materials are all insoluble or little soluble in water. This is because it is required in the art for an adhesive material to have a water-resistance as one property.

These conventional adhesive materials, however, often can not produce desired adhesive effects unless they are added in a relatively large amount (e.g., at least 2% by weight or more) relative to the phosphor to be coated on the inner wall of the bulb. Further, they tend to lower not only the initial luminous flux of the fluorescent lamp, but also the luminous flux maintenance of the phosphor layer during lightening.

SUMMARY OF THE INVENTION

It is therefore an object of the present invention to provide a phosphor composition comprising a phosphor coated with an adhesive material which can suppress a lowering of the initial luminous flux as well as luminous flux maintenance of a discharge lamp, and exhibit a sufficient adhesive strength even in a small amount.

Another object of the present invention is to provide a phosphor-coating composition and a discharge lamp, using an adhesive material of the present invention.

According to the present invention, there is provided a phosphor composition comprising phosphor particles, and at least one water-soluble rare earth compound or a derivative thereof, uniformly adhering to, or covering, the surface of each phosphor particle in an amount of 0.001 to 5% by weight in terms of the corresponding rare earth oxide, based on the weight of the phosphor particles.

A phosphor-coating composition of the present invention comprises phosphors, at least one water-soluble binder, and at least one water-soluble rare earth compound or a derivative thereof, uniformly adhering to, or covering, the surface of each phosphor particle in an amount of 0.001 to 5% by weight in terms of the corresponding rare earth oxide, based on the weight of the phosphor particles. The phosphor-coating composition of the invention may be present in a powdery form or in an aqueous medium. The latter, aqueous phosphor-coating composition contains the water-soluble rare earth compound dissolved in water. An alkaline hydroxide may be added to the aqueous coating composition. In this case, the water-soluble rare earth compound will be converted into colloidal rare earth hydroxide (derivative).

A discharge lamp of the invention comprises a bulb, and a phosphor layer applied to an inner wall of the bulb. The phosphor layer contains phosphor particles, and at least one oxidic compound of a rare earth element, uniformly adhering to, or covering the surfaces of each phosphor particle in an amount of from 0.001 to 5% by weight, based on the weight of the phosphor particles.

A method of preparing a phosphor composition of the invention, as well as a method of preparing a discharge lamp of the invention, are also within the scope of the present invention.

DETAILED DESCRIPTION OF THE PREFERRED EMBODIMENTS

Figure 1:
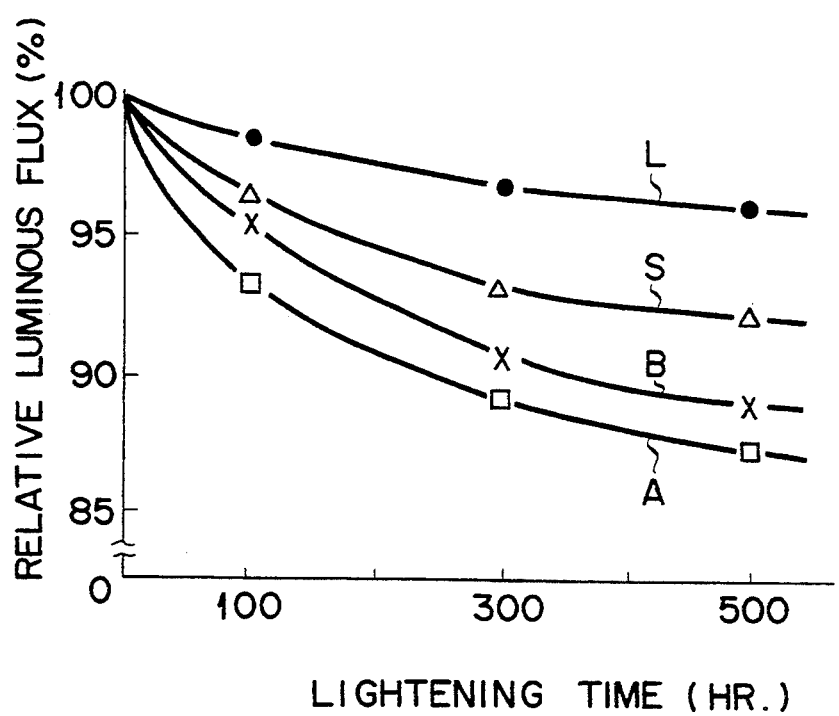
FIG. 1 is a graph showing variation with time of the luminous flux maintenance of a fluorescent lamp according to the invention, in comparison with that of the comparative lamp.

The present invention will now be described in more detail.

The present inventors have studied on adhesive materials to be present in a phosphor layer, and have found that by using a water-soluble rare earth compound as an adhesive material, and applying the water-soluble compound in the form of an aqueous solution to phosphor particles, followed by drying, a phosphor composition is obtained which can provide, when coated as a layer, a phosphor layer having improved luminous flux characteristics. Also, they have found that a discharge lamp also having improved luminous flux characteristics can be produced when the water-soluble rare earth compound is added to, and dissolved in, an aqueous phosphor-coating liquid and the resultant liquid is applied to an inner wall of the bulb, followed by drying. It will be noteworthy that a discharge lamp having excellent characteristics can be produced by using a water-soluble compound as an adhesive material.

In the present invention, the water-soluble compound of the rare earth element is used in an amount of 0.001 to 5 parts by weight in terms of the corresponding oxide, $R_2O_3$, where R represents a rare earth element, based on 100 parts by weight of the phosphor particles (i.e., 0.001 to 5% by weight in terms of, or calculated as the corresponding rare earth oxide, based on the weight of the phosphor particles). Preferably water-soluble rare earth compound is used in an amount of 0.2 to 1.5% by weight in terms of, or calculated as, the corresponding rare earth oxide, based on the weight of the phosphors.

Rare earth compounds are compounds of a rare earth element which is a generic name for those elements belonging to Group IIIA of the Periodic Table, i.e., scandium, yttrium, and lanthanoids (15 elements).

The rare earth elements particularly useful in the invention include: scandium (Sc), yttrium (Y), lanthanum (La), samarium (Sm), europium (Eu), gadolinium (Gd), dysprosium (Dy), holmium (Ho), thulium (Tm) and lutetium (Lu). Particularly preferred are yttrium and lanthanum.

Water-soluble means that the rare earth compounds are almost freely soluble in water intended to use.

The water-soluble rare earth compounds used in the present invention are ultimately converted into the corresponding oxidic compounds, including oxides, in a baking step, which will be explained later, or in the forming step, including forming the bulb into a circular shape, by which the coated phosphors adhere more firmly to the inner wall of the bulb. It is desirable that the rare earth compounds are white in color so as to well reflect light. The water-soluble rare earth compounds used in the invention include inorganic acid salts such as nitrates, sulfates, borates, phosphates; halides such as chlorides and bromides; and organic acid salts such as acetates. Examples of the water-soluble rare earth compound preferably used in the invention are yttrium nitrate, lanthanum nitrate, yttrium chloride, lanthanum chloride, dysprosium chloride, yttrium acetate, and lanthanum acetate. Among these, the nitrates, chlorides and acetates are particularly suitable.

In the present invention, the water-soluble rare earth compounds are used in the form of an aqueous solution ultimately, for purposes of application to the surfaces of the phosphor particles, and/or of preparation of an aqueous phosphor-coating liquid. The conventional adhesive materials, though used in the form of fine particles, have a relatively large (for instance, from 0.5 to 2 $\mu$m), so that they will adhere to surfaces of phosphor particles as larger coagulated particles. On the other hand, the water-soluble rare earth compounds of the invention are used in the form of an aqueous solution, and even when converted into hydroxides by an alkali addition, which will be explained later, they will be colloidal particles, which are extra fine particles of not larger than submicron when considered as particles. Therefore, the water-soluble rare earth compounds can uniformly adhere to, and cover, the surfaces of phosphor particles, and can greatly enhance the adhesive strength of the phosphor particles to each other as well as to the glass bulb even when used in a small amount.

Further, since the rare earth-based adhesive material of the invention can adhere uniformly to the surfaces of the phosphor particles (i.e., cover the surface of each phosphor particle as a film), they can suppress the deterioration of the phosphors caused by sputtering, adsorption of mercury and a mercury ray of 184.5 nm wavelength, etc., during the lightening of the discharge lamp, leading to a remarkably improved luminous flux maintenance of the lamp.

Furthermore, a manufacturing time of a discharge lamp can be remarkably shortened as compared with that of the conventional method which involves preparing a slurry of fine particles of adhesive materials, since the rare earth-based adhesive material of the invention is used in the form of an aqueous solution. For example, the conventional slurry of fine particles requires a preparation time of several ten hours or more.

The present invention is applicable to any phosphors other than silicate-based phosphors described previously. Examples of the phosphors used in the invention include, in addition to those used in Examples described below, halophosphate phosphors such as $3Ca_3(PO_4)\cdot 2Ca(F, Cl)_2:Sb^{3+}$, $3Ca_3(PO_4)_2Ca(F, Cl)_2:Sb^{3+}$, $Mn^{2+}$, $(Ba, Ca, Mg)_{10}(PO_4)_6Cl_2:Eu^{2+}$; phosphate phosphors such as $Sr_2P_2O_7:Sn^{2+}$, $LaPO_4:Ce^{3+}$ and $Tb^{3+}$; tungstate phosphors such as $CaWO_4$, $CaWO_4:Pb^{2+}$; aluminate phosphors such as $BaMg_2Al_{16}O_{27}:Eu^{2+}$, $SrMgAl_{10}O_{17}:Eu^{2+}$; and rare earth phosphors such as $Y_2O_3:Eu^{3+}$ and $6MgO\cdot As_2O_5:Mn^{4+}$, etc. The present invention is applicable not only to the single phosphors, but also to a mixture of the phosphors, e.g., multi-component type mixed phosphors such as three-component type phosphor containing a blue luminous phosphor $(Ba, Ca, Mg)_{10}(PO_4)_6Cl_2:Eu^{2+}$, a green luminous $LaPO_4:Ce^{3+}$, $Tb^{3+}$, and a red luminous phosphor $Y_2O_3:Eu^{3+}$. Usually, phosphors have an average particle diameter of from 3 to 8 μm, and those of 5 to 6 μm are often used.

The phosphor composition of the present invention can be prepared using the water-soluble rare earth compound, by any of the following three methods (1) to (3).

(1) An aqueous solution of the rare earth compound is sprayed onto the phosphor particles, followed by drying.

More specifically, wet phosphor particles prepared according to the conventional method by mixing and firing phosphor raw materials, followed by pulverization and washing with water are transferred into, for instance, a transferring pipe by hot air (temperature of e.g., 60° to 100° C.). An aqueous solution of the rare earth compound is sprayed thereto from a nozzle. The treated phosphor particles are collected at the downstream side by a filter. Thus, the phosphor particles coated uniformly by the water-soluble rare earth compound on their surfaces can be obtained.

(2) The phosphor particles and water-soluble rare earth compound, both in a powder form, are mixed well, to which water is added and stirred well. Thereafter, the resultant mixture is dried.

In this method, water is added in amount sufficient to dissolve the rare earth compound used and well mix the mixture with the rare earth compound. Usually, water is added in an amount of from 100 to 150 parts by weight, based on 100 parts by weight of the rare earth compound. In this method, too, wet phosphor particles, as described with reference to method (1) above, can be used, which are prepared according to the conventional method by mixing phosphor raw materials, followed by firing, grinding and washing with water. In drying to obtain the desired phosphor composition, an absolute dryness of the phosphor particles is not required, but a dryness to such an extent will be sufficient that the so dried particles can be treated as powder or particle in the subsequent steps. Therefore, the drying may be carried out at a temperature of, for instance, 60° to 100° C. with a drying time of, for example, 3 to 15 hours, depending on the amount to be dried. The same also applies to the drying in method (1) above.

(3) An aqueous solution of the rare earth compound is added to the phosphor particles. An alkaline inorganic hydroxide is added to the mixture, which is well mixed and dried. In this method, the wet phosphors may be used as in methods (1) and (2), and the drying may be carried out in the same way as in method (2).

In method (3), the amount of water contained in the aqueous solution of the rare earth is the same as the amount of water added in method (2). The alkaline compound used in method (3) includes sodium hydroxide, potassium hydroxide, and ammonium hydroxide, and is added in the form of an aqueous solution. The most preferable alkaline compound is ammonium hydroxide. The alkaline compound is added in such an amount as to adjust the pH value of the mixture to about 7.3 to 10.5, preferably about 8.5 to 9.8. By the addition of the alkaline compound, the rare earth compound is converted into the corresponding colloidal hydroxide, which will adhere uniformly to the surfaces of the phosphor particles.

Meanwhile, in order to obtain a discharge lamp in accordance with the present invention, an aqueous phosphor-coating liquid is prepared, which contains the water-soluble rare earth compound and in which the phosphor particles are dispersed, and the coating liquid is coated on the inner wall of the bulb (usually a glass bulb), followed by baking. Note that the rare earth compound of the invention is not doped into the phosphor.

The aqueous phosphor-coating liquid of the invention contains a water-soluble binder, in addition to the phosphor particles and water-soluble rare earth compound. The water-soluble binder is used to adjust the viscosity of the coating liquid so as to attain an easy application of the coating liquid. The binder is added in an amount sufficient to obtain the viscosity of the coating liquid of, usually, about 20 to 60 centipoises. Preferred examples of the water-soluble binder include polyethyleneoxide (PEO), water-soluble cellulose compounds (for example, hydroxyethylated cellulose, hydroxypropylated cellulose, carboxymethylcellulose), water-soluble polyacrylates (for example, polymethyl methacrylate). The most preferable binder is PEO.

Usually, the aqueous phosphor-coating liquid of the invention contains about 30 to 70% by weight of water. The coating liquid may further contain a surface active agent and/or a defoaming agent as in the conventional coating liquid.

In order to prepare the aqueous phosphor-coating liquid, use may be made of the phosphor composition of the invention noted previously. Thus, an aqueous solution of the binder separately prepared may added to the phosphor composition of the invention, and the resultant mixture is mixed well to obtain a desired aqueous phosphor-coating liquid.

A second way of preparing an aqueous phosphor-coating liquid is to sufficiently mix together the phosphor particles, the aqueous solution of the binder separately prepared, and the aqueous solution of the rare earth compound separately prepared.

A third way of preparing an aqueous phosphor-coating liquid involves firstly preparing a powdery coating composition by homogeneously mixing fine particles of water-soluble binder, fine particles of water-soluble rare earth compound, and phosphor particles. Then, water is added to the powdery composition and mixed well to obtain a desired aqueous phosphor-coating liquid. When the powdery coating composition is prepared beforehand according to this method, a total time required for preparation of the aqueous phosphor-coating liquid can be remarkably shortened. Namely, when an aqueous solution is separately prepared from the powdery binder, it will take for about 4 to 8 hours due to a poor dispersibility of the binder powder in water. In contrast, when the phosphors, rare earth compound and binder, all in a powder form, are mixed well beforehand, the binder will be dissolved in water, by the addition of water to the powdery mixture and stirring, within a short period of time on the order of only 10 minutes, to give the desired aqueous phosphor-coating liquid.

Meanwhile, the aqueous phosphor-coating liquid containing the water-soluble rare earth compound is acidic in general, and sometimes its viscosity may be lowered with time. Also it may possibly suffer from the growth of micro-organisms such as mould, etc., causing a deterioration in its property, when left to stand for a long time. Further, the acidic coating liquid may affect the durability of the manufacturing equipments of discharge lamps.

To overcome these problems, it is recommended that the pH of the aqueous phosphor-coating liquid of the invention be adjusted to a value from 7.3 to 10.5. The thusly pH-adjusted phosphor-coating liquid will be stable in terms of viscosity for a long time and can suppress the growth of microorganisms without damaging manufacturing equipments. The pH adjustment can be carried out by adding an alkaline inorganic hydroxide to the phosphor-coating liquid during or after the preparation of the coating liquid. Alternatively, the alkaline hydroxide may be added directly to an aqueous solution of the water-soluble rare earth compound used for the preparation of the phosphor-coating liquid.

The alkaline hydroxide used for the pH adjustment may include sodium hydroxide, potassium hydroxide, and ammonium hydroxide. Among these, ammonium hydroxide is most preferable because it does not leave impurities remaining in the final phosphor layer. It is advantageous that the alkaline compound is added in the form of an aqueous solution. The pH value of the aqueous phosphor-coating liquid is preferably within a range of from 8.5 to 9.8.

By the addition of the alkaline hydroxide, the water-soluble rare earth compound in the phosphor-coating liquid is converted into a colloidal hydroxide, as described above, which will result in an easier adherence to the surfaces of the phosphor particles.

Further, an auxiliary adhesive material may be added to the phosphor-coating liquid, if a further improvement in the adhesive strength of the phosphor layer to the inner wall of the bulb is desired, as in a case where a circular-tube discharge lamp is produced. The auxiliary adhesive material is a water-soluble compound, and is selected from the group consisting of borate salts, phosphate salts, boric acid and phosphoric acid (excluding salts of the rare earth elements). As borates, ammonium borate may be exemplified.

The auxiliary water-soluble adhesive material may be present such that its anions is present in an equimolar amount to cations of the water-soluble rare earth compound (i.e., ions of the rare earth element), or may be either molar excessive or smaller relative to the said cations. Usually, the auxiliary adhesive material is used in an amount, calculated as the corresponding oxide, of from 0.001 to 5% by weight relative to the weight of the phosphors. The auxiliary adhesive material may be used where circular-tube discharge lamps are produced, which require a stronger adhesion of the phosphor layer to the glass bulb.

The thus prepared aqueous phosphor-coating liquid as described above is applied to the inner wall of the glass bulb in a conventional manner, and is baked. The baking may be carried out at a temperature up to 700° C., usually from 450° to 600° C. The baking time may be about 5 to 20 minutes. During baking, the binder contained in the phosphor layer will be decomposed and removed. At this time, the water-soluble rare earth compound, or a derivative thereof, i.e., hydroxide, can be converted into the corresponding oxidic compound. The converted oxidic compound of the rare earth element includes the rare earth oxide, and also a composite oxide formed as a result of dehydration of the rare earth hydroxide during the baking, of which structure can not be yet defined clearly.

The thickness of the phosphor layer after baking is usually about 15 to 25 μm.

The subsequent steps for the manufacture of a lamp may be carried out in a conventional manner. Thus, after the phosphor layer is formed on the bulb inner wall as described above, the bulb is formed into a circular shape (forming temperature: around 800° C.), if desired. Then, the bulb is evacuated, and a rare gas is sealed, together with mercury, in the bulb, to whose both ends caps or heads are attached, obtaining a desired lamp. The structure itself of a discharge lamp, e.g., a fluorescent lamp of the invention is substantially the same as the conventional one, and includes well-known straight-tube and circular-tube structures.

As has been explained above, according to the present invention, a discharge lamp having an improved luminous flux maintenance can be produced relatively in a simple way.

The present invention will now be described below by way its examples.

EXAMPLE 1

100 g of calcium halophosphate phosphor powder, 140 g of a 0.7% aqueous solution of PEO, and 3.2 g of an aqueous solution containing lanthanum nitrate in an amount equivalent to 0.5% by weight as lanthanum oxide, based on the weight of the phosphors (13.3% calculated as lanthanum), were mixed together to prepare an aqueous phosphor-coating liquid. The prepared phosphor-coating liquid was applied to the inner wall of a straight-tube glass bulb for 40WSS fluorescent lamp, and was baked in an electric furnace at 450° C. for 15 minutes, followed by cooling, to obtain the glass bulb having a phosphor layer 20 μm thick. Then, the glass bulb was evacuated, and charged with a rare gas together with mercury, and head were attached to both ends thereof, according to a conventional method. Thus, a straight-tube type 40WSS fluorescent lamp was obtained.

For comparison, various fluorescent lamps were prepared in the same manner as in Example 1, but under the following conditions: free from the adhesive material (i.e., without the aqueous solution of lanthanum nitrate) (Comparative Example 1); using colloidal alumina in an amount of 1% by weight relative to the weight of the phosphors, instead of the aqueous solution of lanthanum nitrate (Comparative Example 2); or using calcium pyrophosphate in an amount of 2% by weight relative to the weight of the phosphors, instead of the aqueous solution of lanthanum nitrate (Comparative Example 3).

FIG. 1 is a graph illustrating changes of luminous flux maintenances of the fluorescent lamps of Example 1 and Comparative Examples 1–3. In the figure, the curve L relates to Example 1 (the present invention), the curve S to Comparative Example 1, the curve A to Comparative Example 2 and the curve B to Comparative Example 3, respectively.

As is apparent from FIG. 1, the luminous flux maintenance after 500-hour lightening of the fluorescent lamp was approx. 92% for Comparative Example 1, which means a lowering of 8% from the initial flux, whereas that of the present invention was approx. 96%, lowering of only 4% from the initial flux. Also those of Comparative Examples 2 and 3 were approx. 87% and approx. 89% respectively, which means a lowering of about 13% for the former and of about 11% for the latter. In other words, the fluorescent lamp of the present invention was found to be capable of attaining improvement in the luminous flux maintenance by approx. 7 to 9% relative to the lamps of Comparative Examples 2 and 3, at the same time point.

Then, various phosphor-coating liquids were prepared by varying the amount of lanthanum nitrate, calculated as lanthanum oxide, in % by weight relative to the weight of the phosphors. Using these coating liquids, fluorescent lamps were prepared in the same way as in Example 1. These lamps were subjected to measurement of luminous flux maintenance after 500-hour lightening. The results are shown in FIG. 2.

Figure 2:
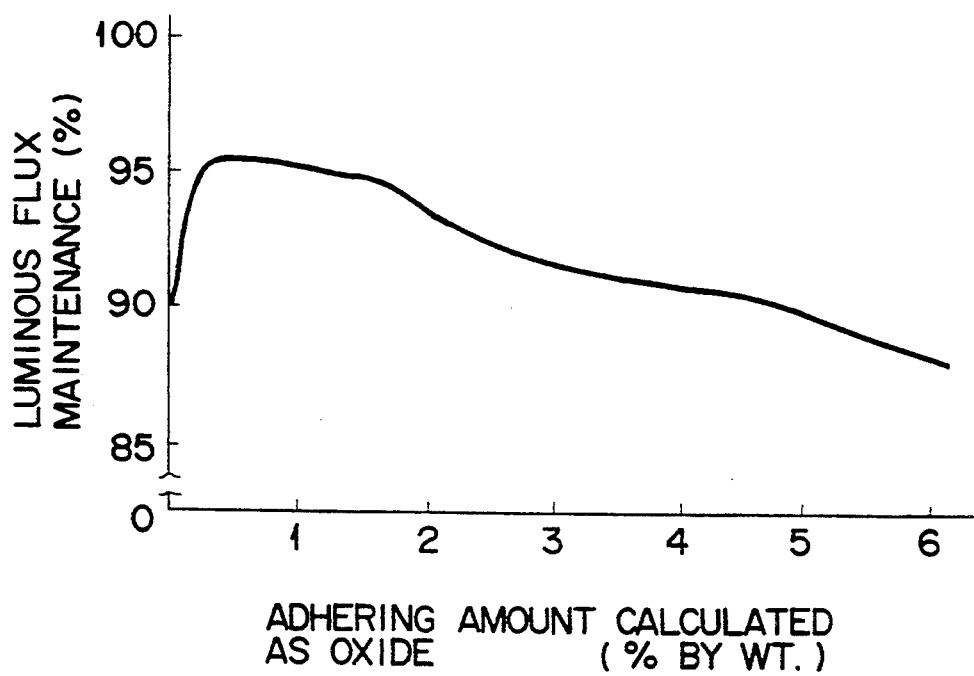
FIG. 2 is a graph showing a relationship between the amount of a water-soluble rare earth compound and the luminous flux maintenance.

As is clear from FIG. 2, by using a water-soluble rare earth compound in a relatively small amount, i.e., from 0.001 to 5% by weight of the phosphor, according to the invention, a fluorescent lamp can be obtained, which is significantly prevented from a lowering of the luminous flux maintenance, as compared with that of the conventional adhesive material. Further, it is seen that when the water-soluble rare earth compound is used in an amount of 0.2 to 1.5% by weight, calculated as the corresponding rare earth oxide, relative to the phosphor, the luminous flux maintenance after 500-hour lightening can be retained at 95% or higher, namely the lowering of the luminous flux can be suppressed to 5% or less.

Now, it has been demonstrated that an employment of even a small amount of the water-soluble rare earth compound produces an improvement in the luminous flux maintenance. However, practically serviceable fluorescent lamps can not be obtained if the phosphor layer containing the rare earth compound has a poor adhesive strength to the inner wall of the bulb.

So, the adhesive strength of the phosphor layer was measured by the so-called pneumatic peeling test, described below, on the fluorescent lamps of Example 1 and Comparative Examples 2 and 3, as well as those prepared by varying lanthanum nitrate amount.

Pneumatic Peeling Test

Air under a predetermined pressure (usually, 0.8 kg/cm$^2$) is blown from a nozzle arranged at predetermined distance and having a predetermined diameter (usually, 2 mm) against the inner wall of the glass bulb removed of the headers, for a predetermined period of time, and the peel-off hole having the maximum diameter made in the phosphor layer, caused by the peeling-off of a part of the phosphor layer, is measured as a peel-off diameter. The peel-off diameter is a measure for evaluating the adhesive strength: the larger the peel-off diameter, the weaker the adhesive strength.

Figure 3:
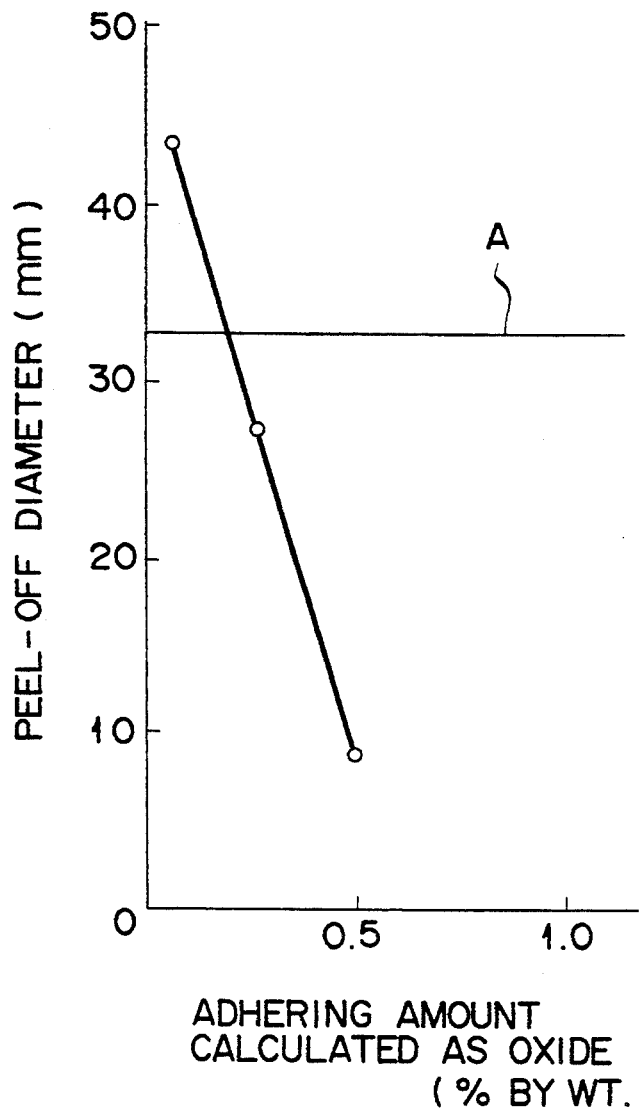
FIG. 3 is a graph showing a relationship between the amount of a water-soluble rare earth compound and the adhesive strength of the phosphor layer of a fluorescent lamp.

The results are shown in FIG. 3. From the figure it is apparent that the peel-off diameter of the phosphor layer of the present inventive fluorescent lamp, where the amount of the adhesive material is only 0.5% by weight or less in terms of oxide, relative to the weight of phosphors, can be decreased to an average value of 9 mm, i.e., not larger than 10 mm. In contrast, the peel-off diameters of the phosphor layers of the Comparative Examples 2 and 3 were approx. 32 mm as indicated by the line A in the figure.

EXAMPLES 2–4

Various fluorescent lamps were produced in the same way as in Experiment 1, except that, instead of the lanthanum nitrate used in Example 1, lanthanum chloride (Example 2), lanthanum acetate (Example 3), and yttrium nitrate (Example 4) were used, respectively, as a water-soluble rare earth compound, in the same amount as in Example 1 (i.e., 0.5% by weight calculated as the corresponding rare earth oxide, relative to the phosphor).

The phosphor layers of these fluorescent lamps were found to have substantially the same adhesive strength as that of Example 1. The luminous flux maintenances after 500-hour lightening of these lamps were quite satisfactory as high as 96.8% (Example 2), 96.6% (Example 3), and 97.0% (Example 4).

EXAMPLE 5

120 g of calcium halophosphate phosphor powder, 7.7 g of aqueous solution of lanthanum chloride (equivalent to 13.3% calculated as lanthanum), and 300 ml of deionized water were charged in a 500 ml breaker, and stirred well. To this mixture, ammonium hydroxide was added dropwise to raise a pH value of the mixture to 10.0. Thereafter, the mixture was washed with water, dried and was sieved to obtain dry phosphor particles coated uniformly with lanthanum hydroxide of which amount was equivalent to 1% by weight calculated as lanthanum oxide, relative to the phosphors. The coated powdery phosphors were capable of handling as powder.

Using the coated phosphors, a fluorescent lamp was prepared as in Example 1. The adhesive strength of the phosphor layer of this fluorescent lamp was substantially the same as that of Example 1. The luminous flux maintenance after 500-hour lightening was 94.2%, which is an improved value.

EXAMPLE 6

100 g of calcium halophosphate phosphor powder, 3.2 g of aqueous solution of lanthanum nitrate containing lanthanum nitrate in an amount equivalent to 0.5% by weight calculated as lanthanum oxide, relative to the phosphors, and 50 g of deionized water were mixed together. The resultant mixture was dried at 70° C. for 10 minutes to obtain dry phosphor particles coated uniformly with lanthanum nitrate. The prepared powdery phosphors were capable of handling as powder.

The powdery coated calcium halophosphate phosphor thus prepared was added with 140 g of 0.7% aqueous solution of PEO, and the mixture was stirred well to obtain a phosphor-coating liquid. Using the phosphor-coating liquid, a 40WSS fluorescent lamp was prepared as in Example 1.

The obtained fluorescent lamp had a phosphor layer having an adhesive strength slightly stronger than that of Example 1. Also the luminous flux maintenance after 500-hour lightening was as high as 97.1%.

EXAMPLE 7

According to a conventional method, phosphor raw materials were mixed, fired, crushed, dried and washed with water to obtain wet halophosphate phosphor powder. 10 kg of this wet phosphor powder were transferred in a transferring pipe by means of hot air stream, during which an aqueous solution of yttrium chloride (5% by weight calculated as yttrium) was sprayed thereto from a nozzle in such an amount that adhering amount of yttrium chloride to the phosphors become 1% by weight calculated as yttrium oxide, relative to the phosphors. The resultant phosphors were collected by means of a back filter.

Using the dry coated phosphor particles obtained above, a phosphor-coating liquid was prepared, and a fluorescent lamp was obtained, as in Example 6.

The adhesive strength of the phosphor layer of this lamp was as high as that of Example 6. The luminous flux maintenance after 500-hour lightening was also excellent as 96.8%.

EXAMPLE 8

100 g of three component type phosphor powder obtained by mixing divalent europium-activated strontium calcium barium chlorophosphate phosphor as a blue luminous component, cerium and terbium-activated lanthanum orthophosphate phosphor as a green luminous component and trivalent europium-activated yttrium oxide phosphor as a red luminous component, 93 g of 0.7% aqueous solution of PEO, and 10% aqueous solution of yttrium chloride (containing yttrium chloride in an amount equivalent to 0.8% by weight calculated as yttrium oxide, relative to the phosphor), were mixed together to prepare a phosphor-coating liquid. Using the phosphor-coating liquid, a fluorescent lamp was prepared as in Example 1.

The fluorescent lamp thus obtained was comparable to a lamp prepared without using yttrium chloride in terms of a luminous color and a color rendering property. The adhesive strength of the phosphor layer was measured as in Example 1 to obtain the peel-off diameter of only 4 mm. On the other hand, the peel-off diameter of a phosphor layer of a lamp prepared using a conventional calcium pyrophosphate slurry containing calcium pyrophosphate in an amount of 4% by weight relative to phosphors, was 30 mm. The luminous flux maintenance of the lamp of Example 8 after 500-hour lightening was 94.1%, which was superior to that of the fluorescent lamp prepared using, as an adhesive material, 1.5% by weight of calcium pyrophosphate relative to the phosphors, i.e. about 91%.

EXAMPLE 9

100 g of calcium halophosphate phosphor powder were suspended in 140 g of 0.7% aqueous solution of PEO. The resultant suspension was added with 3.2 g of aqueous solution of lanthanum nitrate (13.3% calculated as lanthanum) containing lanthanum nitrate in an amount equivalent to 0.5% by weight calculated as lanthanum oxide, relative to the phosphors, and was mixed sufficiently. The pH value of this suspension was about 4.

Then, aqueous ammonia was added to the suspension above with stirring to adjust the pH value to 9.0.

The pH adjusted suspension (phosphor-coating liquid) was little lowered in its viscosity after storage of one month.

Using the phosphor-coating liquid, a fluorescent lamp was prepared as in Example 1, except that the baking temperature was 580° C.

For comparison, 100 g of calcium halophosphate phosphor were suspended in an aqueous solution of PEO as described above, to which a slurry of calcium pyrophosphate containing 4% by weight of calcium pyrophosphate relative to the phosphors, was added to obtain a phosphor-coating liquid. A fluorescent lamp was prepared using this phosphor-coating liquid (Comparative Example 4).

The initial luminous flux of the fluorescent lamp of Comparative Example 4 was 3200 [lm], whereas that of Example 9 was 3240 [lm]. Concerning the luminous flux after 2000-hour lightening, the lamp of Comparative Example 4 was 2720 [lm], a lowering by approx. 15% relative to the initial luminous flux, whereas the lamp of Example 9 was 2940 [lm], a lowering by only 9% relative to the initial luminous flux.

Further, the adhesive strength of the phosphor layer was measured in the same way as in Example 1 to obtain a peel-off diameter of 30 mm or more for the lamp of Comparative Example 4. In contrast, the peel-off diameter of Example 9 was only about 8 mm, which means a three times or more higher strength than Comparative Example 4.

EXAMPLE 10

100 g of the three component type phosphor as used in Example 8 were suspended in 150 g of 0.7% aqueous solution of PEO. The resultant suspension was added with 3.2 g of aqueous solution of lanthanum nitrate (13.3% calculated as lanthanum) containing lanthanum nitrate in an amount equivalent to 0.5% by weight calculated as lanthanum oxide, relative to the phosphors, and was mixed well. The pH value of the suspension was about 4.

Then, the thus prepared suspension was added with aqueous ammonia to adjust the pH value to 9.0.

The pH-adjusted suspension (phosphor-coating liquid) was little lowered in in its viscosity after storage of 14 days.

Using the phosphor-coating liquid, a fluorescent lamp was prepared as in Example 9.

For comparison, 100 g of the three component phosphor as used in Example 10 were suspended in an aqueous solution of PEO, as in Example 10, to which a slurry of aluminum oxide fine particles containing 1.0% by weight of aluminum oxide fine particles relative to the phosphors, was added to obtain a phosphor-coating liquid. A fluorescent lamp was prepared using this phosphor-coating liquid (Comparative Example 5).

The initial luminous flux of the fluorescent lamp of Comparative Example 5 was 3520 [lm], whereas that of Example 10 was 3540 [lm]. The luminous flux after 500-hour lightening of Comparative Example 5 was lowered by approx. 5% relative to the initial luminous flux, whereas that of the Example 10 was lowered by only about 2% relative to the initial luminous flux.

The adhesive strength of the phosphor layer was measured as in Example 1 to obtain the peel-off diameter of 30 mm or larger for the fluorescent lamp of Comparative Example 5. In contrast, the peel-off diameter of the lamp of Example 10 was only about 5 mm, which means a 6 times or more higher strength than Comparative Example 5.

EXAMPLE 11

100 g of tin-activated strontium pyrophosphate phosphate phosphor powder were suspended in 100 g of 0.7% aqueous solution of PEO. To the suspension, 10% aqueous solution of yttrium chloride containing yttrium chloride in an amount equivalent to 0.3% by weight calculated as yttrium oxide, relative to the phosphors was added, and the resultant suspension was mixed well. The pH value of the suspension was about 4.5.

Then, aqueous ammonia was added to the suspension thus prepared, while stirring, to adjust the pH value to 9.0.

The pH adjusted suspension (phosphor-coating liquid) was little lowered in its viscosity even after 14-day storage.

Using the phosphor-coating liquid prepared above, a fluorescent lamp was prepared as in Example 9.

For comparison, 100 g of the phosphor were suspended in the aqueous solution of PEO, as in Example 11, to which a slurry of calcium pyrophosphate fine particles was added in an amount of 4% by weight relative to the phosphors, to obtain a phosphor-coating liquid. A fluorescent lamp was prepared using this phosphor-coating liquid (Comparative Example 6).

The initial luminous flux of the fluorescent lamp of Comparative Example 6 was 1720 [lm], whereas that of Example 11 was 1750 [lm]. The luminous flux after 500-hour lightening of the lamp of Comparative Example 6 was lowered by approx. 18% relative to the initial luminous flux, whereas that of the lamp of Example 11 was lowered by only 11% relative to the initial luminous flux.

The adhesive strength of the phosphor layer was measured as in Example 1 to obtain the peel-off diameter of approx. 28 mm for the lamp of Comparative Example 6. In contrast, the peel-off diameter of the lamp of Example 11 was approx. 20 mm, i.e., superior than Comparative Example 6.

EXAMPLE 12

1.2 kg of calcium halophosphate phosphor powder and 15 g of fine powder of lanthanum nitrate $[La(NO_3)_3 5.6H_2O]$ were mixed well, to which 5 g of fine powder of PEO was added, and was mixed sufficiently to obtain powdery phosphor-coating composition.

To the powdery phosphor-coating composition, 995 g of deionized water was added, and pH of the mixture was raised to 9.1 by the addition of aqueous ammonia with stirring. The stirring was conducted for about 8 minutes. After additional stirring for 5 minutes, the mixture was allowed to stand for 3 minutes. Thus, a desired phosphor-coating liquid was obtained.

Using the phosphor-coating liquid obtained above, a fluorescent lamp was prepared as in Example 1. The lamp was found to have substantially the same adhesive strength of the phosphor layer, and luminous flux characteristics, as those of the lamp of Example 1.

EXAMPLE 13

620 g of the three component type phosphor powder as used in Example 8, 7.8 g of a fine powder of lanthanum nitrate $[La(NO_3)_3 5.6H_2O]$ and 3.5 g of a fine powder of PEO were mixed well to prepare a powdery phosphor-coating composition.

The coating composition was added to 496.5 g of deionized water to prepare a desired phosphor-coating liquid as in Example 12.

Using the coating liquid, a fluorescent lamp was prepared as in Example 1. The lamp was found to have substantially the same adhesive strength of the phosphor layer, light emitting and luminous flux characteristics as those of the lamp of Example 8.

EXAMPLE 14

20.6 g of aqueous solution of lanthanum nitrate containing lanthanum nitrate in an amount equivalent to 12.8% by weight calculated as lanthanum, and 10 g of 15.4% aqueous ammonia were added to 90 g of deionized water. The mixture was stirred for several minutes to obtain an aqueous adhesive material-containing liquid.

Separately, 48 g of calcium halophosphate phosphor powder were suspended in 40 g of 0.5% aqueous solution of PEO to obtain a phosphor suspension.

To the phosphor suspension, 9.3 g of the previously prepared aqueous adhesive material-containing liquid (containing lanthanum nitrate in an amount equivalent to 0.5% by weight calculated as lanthanum oxide, relative to the phosphors) were added, and mixed well to prepare a phosphor-coating liquid.

Using the phosphor-coating liquid prepared above, a fluorescent lamp was prepared as in Example 9. The initial luminous flux of the lamp was 3240 [lm], and the luminous flux after 2000-hour lightening was 2940 [lm], i.e., a lowering of only about 9% relative to the initial luminous flux.

EXAMPLE 15

217.2 g of calcium halophosphate phosphor powder were suspended in 200 g of 0.5% aqueous solution of PEO. To this suspension, 5.26 g of aqueous solution of lanthanum nitrate containing lanthanum nitrate in an amount equivalent to 0.5% by weight calculated as lanthanum oxide, relative to the phosphors (equivalent to 17.6% calculated as lanthanum) were added, together with 2.03 g of aqueous solution of ammonium borate containing ammonium borate in an amount equivalent to 19.4% calculated as $BO_3$, relative to the phosphor. The suspension was mixed sufficiently. To the suspension, aqueous ammonia was added with stirring to adjust the pH value to 9.0. Further, the suspension was stirred additionally for about 2 to 5 minutes to prepare a phosphor-coating liquid.

The phosphor-coating liquid was little lowered in its viscosity even after left to stand for one month.

Using phosphor-coating liquid prepared above, a fluorescent lamp was prepared as in Example 9.

For comparison, a fluorescent lamp was prepared as in Example 15 except that a slurry of calcium pyrophosphate containing 4% by weight of calcium pyrophosphate relative to the phosphor was used in place of aqueous solution of lanthanum nitrate, and that the ammonium was not added (Comparative Example 7).

The initial luminous flux of the fluorescent lamp of Comparative Example 7 was 3200 [lm], whereas that of the lamp of Example 15 was 3250 [lm]. The luminous flux after 2000-hour lightening of the lamp of Comparative Example 7 was 2720 [lm], i.e., a lowering by approx. 15% relative to the initial luminous flux, whereas that of the lamp of Example 15 was 3120 [lm], i.e., a lowering by only about 4% relative to the initial luminous flux.

Further, the adhesive strength of the phosphor layer was measured as in Example to obtain a peel-off diameter of about 30 mm or larger for the lamp of Comparative Example 7. In contrast, the peel-off diameter of the phosphor layer of the lamp of Example 15 was only about 6 mm, which means a five times higher strength than Comparative Example 7.

EXAMPLE 16

105 g of the three component type phosphor powder as used in Example 8 were suspended in 150 g of 0.5% aqueous solution of PEO. The resultant suspension was added with 2.54 g of aqueous solution of lanthanum nitrate containing lanthanum nitrate in an amount equivalent to 0.5% by weight calculated as lanthanum oxide, relative to the phosphor weight (equivalent to 17.6% calculated as lanthanum), together with 1.54 g of aqueous solution of phosphoric acid containing phosphoric acid in an amount equivalent to 19.9% calculated as $PO_4$, relative to the phosphor weight. The resultant suspension was mixed well. Then, the suspension was added with aqueous ammonia with stirring to adjust the pH value to 9.0. The suspension was stirred additionally for about 2 to 5 minutes to prepare a phosphor-coating liquid.

The phosphor-coating liquid was little lowered in its viscosity even after left to stand for 14 days.

Using the phosphor-coating liquid obtained above, a fluorescent lamp was prepared as in Example 9.

For comparison, a fluorescent lamp was prepared as in Example 16 except that a slurry of aluminum oxide containing 1% by weight of aluminum oxide relative to the phosphor weight was used instead of the aqueous solution of lanthanum nitrate and that the ammonia was not added (Comparative Example 8).

The initial luminous flux of the lamp of Comparative Example 8 was 3520 [lm], whereas that of the lamp of Example 16 was 3550 [lm]. The luminous flux after 500-hour lightening of the lamp of Comparative Example 8 was found lowered by approx. 5% relative to the initial luminous flux, whereas that of Example 16 lamp was lowered only by about 2%.

The adhesive strength of the phosphor layer was measured as in Example 1 to obtain a peel-off diameter of about 15 mm for the lamp of Comparative Example 8. In contrast, the peel-off diameter for the lamp of Example 16 was approx. 5 mm, i.e., a three times higher strength than that of Comparative Example.

What is claimed is:

1. A phosphor-coating composition which is to be coated on an inner surface of a fluorescent lamp, said composition comprising:
   halophosphate phosphor particles;
   a water-soluble organic binder comprising polyethylene oxide in an amount sufficient to provide the composition with a viscosity of about 20 to 60 centipoises;
   a water-soluble adhesive material for increasing the adhesive strength between said phosphor particles and the inner surface of the lamp, said adhesive material comprising at least one water-soluble lanthanum compound or a derivative thereof in an amount of from 0.001 to 5% by weight in terms of a corresponding lanthanum oxide, based on the total weight of said halophosphate phosphors; and
   an aqueous medium dissolving said organic binder and said lanthanum compound or derivative thereof, and dispersing said halophosphate particles therein.

2. The composition according to claim 1, wherein said lanthanum compound is selected from lanthanum nitrate, lanthanum chloride, and lanthanum acetate.

* * * * *